United States Patent

Hildebrandt et al.

[15] 3,641,311

[45] Feb. 8, 1972

[54] APPARATUS FOR THE IGNITION OF DIRECT CURRENT WELDING AND CUTTING ARCS

[72] Inventors: Peter Hildebrandt, Ismaning; Walter Ruckdeschel, Munich, both of Germany

[73] Assignee: Linde Aktiengesellschaft, Hollriegelskreuth, Germany

[22] Filed: July 9, 1968

[21] Appl. No.: 743,347

[30] Foreign Application Priority Data

July 11, 1967  Germany ......................P 16 15 364.3

[52] U.S. Cl. ..........................................219/135, 219/131
[51] Int. Cl. ..............................................B23k 9/10
[58] Field of Search ..................219/130, 131, 135, 137; 323/22, 43.5, 44

[56] References Cited

UNITED STATES PATENTS 3,263,157  7/1966  Klein .........................................323/22
3,356,928  12/1967  Parrish...............................219/131 X Primary Examiner—J. V. Truhe
Assistant Examiner—C. L. Albritton
Attorney—Karl F. Ross

[57] ABSTRACT

A system for igniting direct current arcs for welding or cutting of metals, especially plasma welding, cutting and metal treatment and T.I.G. welding, wherein an elevated DC potential of 150 to 2,000 volts is temporarily superposed upon the welding potential of up to 100 volts during the ignition stage and is terminated upon detection of current flow between the electrode and the workpiece via an electronic switch adapted to cut out a primary winding or cut in a secondary winding of a transformer interposed between the line current source and the rectifier. The system is used primarily for the closed chamber welding of metallic cases or shells of fuel elements for a nuclear reactor core under a blanket of helium.

4 Claims, 4 Drawing Figures

PETER HILDEBRANDT
WALTER RUCKDESCHEL
INVENTORS.

BY   Karl F. Ross

ATTORNEY

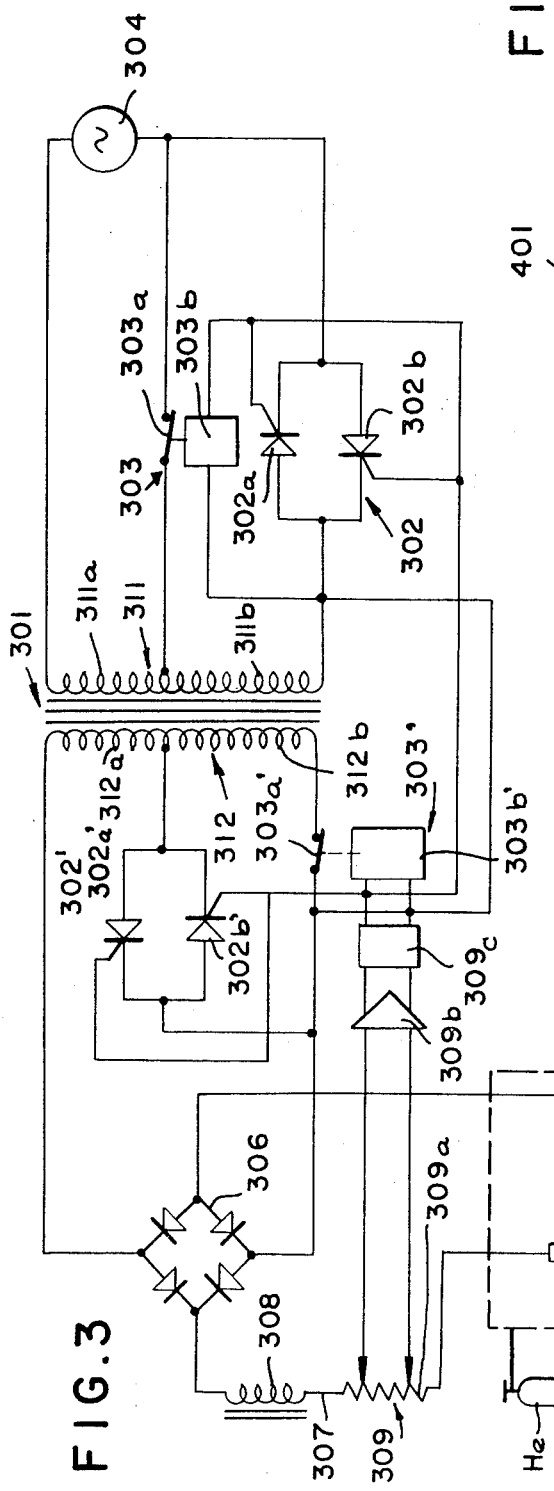
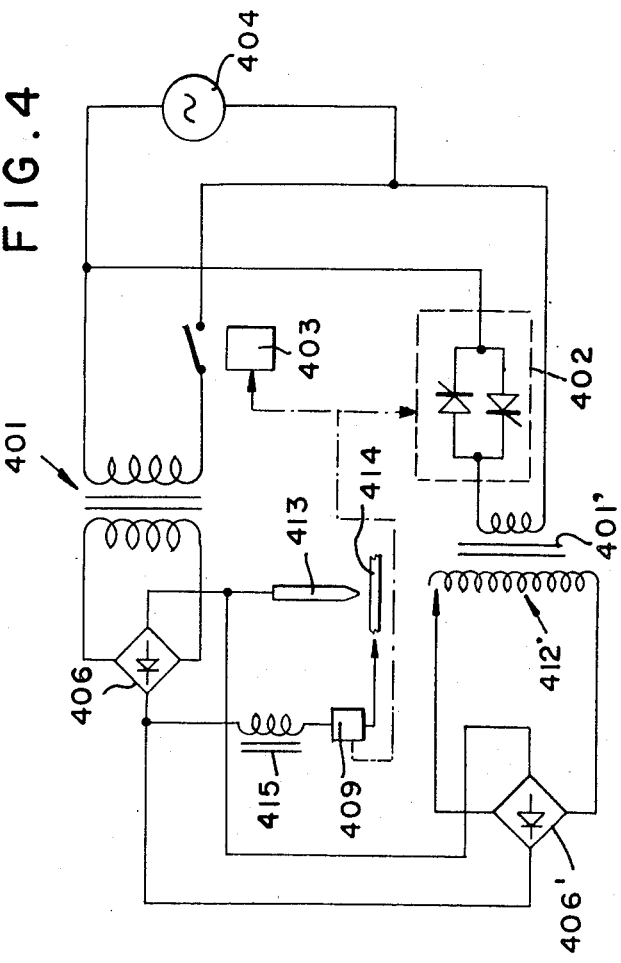
PETER HILDEBRANDT
WALTER RUCKDESCHEL
INVENTORS.
BY Karl G. Ross
ATTORNEY

APPARATUS FOR THE IGNITION OF DIRECT CURRENT WELDING AND CUTTING ARCS

Our present invention relates to a method of and a circuit for the ignition of direct current arc for the DC arc welding or arc cutting of metallic workpieces and especially for the plasma welding, cutting or surface treatment of a metal and T.I.G. welding (i.e., tungsten inert gas welding) wherein the electrode sustaining the arc does not contact the workpiece but is maintained at a distance therefrom while the arc spans the gap between electrode and workpiece.

Numerous direct current arc welding and cutting systems, including those mentioned above, have been commonly used heretofore and are characterized by the maintenance of an arc gap filled with a gas which is ionized so as to render it conductive and permit the generation of an arc or another conductive path between an electrode (generally of the nonconsumable type but often also a consumable electrode rod). In some of these known systems, a high-frequency ignition circuit is provided which is designed to apply a high-frequency potential across the electrode and the workpiece adapted to generate a bundle of sparks and thereby ionize the gas between electrode and workpiece to permit continued passage of the arc. In another earlier method, generally used in plasma welding with throughgoing arcs, an auxiliary discharge is produced by high frequency to ignite the main arc between electrode and workpiece with resulting ionization of the gas therebetween.

We have found that these techniques are not always successful in creating a disturbance-free initial ignition of the arc. Such systems are least effective in so-called "chamber" welding which has come to the fore in recent years. In chamber welding, a protec,ive gas blanket, generally of an inert gas, is introduced into a closed chamber containing the workpiece and prevents interaction between the weldment and heated portions of the workpiece and atmospheric air which usually contacted the weldment and the workpiece in earlier welding systems. The gas blanket has been found to affect detrimentally earlier efforts at ignition of the DC arc.

It is, therefore, the principal object of our invention to provide an improved method of and system for the ignition of direct current electric arcs.

A more specific object of this invention is to provide a system for the ignition of direct current arcs, especially DC welding and cutting arcs for T.I.G. and plasma welding, which allows a disturbance-free generation of the initial ionization state or arc between electrode and workpiece.

Yet another object of our invention is to provide an ignition system for the purposes described which will be effective to produce the desired arc without differences in the ignition characteristics resulting from the use of protective gas blankets of different types and compositions.

A further object of the instant invention is to provide an improved method of welding the metal cans, shells or cases of fuel elements for nuclear reactor cores without endangering operating personnel.

These objects and others, which will become apparent hereinafter, are attainable in accordance with the present invention which provides that an elevated direct current voltage, derived from a source other than the source of the operating direct current voltage, is applied across the workpiece and the arc electrode for a brief period at the inception of welding or cutting and in the absence of a discharge to effect high-voltage breakdown of the gas in the gap between the electrode and the workpiece, this auxiliary high-voltage source being disconnected as soon as the ionization state in the gap allows conduction thereacross and the consequent establishment of the arc. More specifically, we have found that, with the usual operating characteristics of welding DC arcs using potentials up to 100 volts, it is possible to obtain disturbance-free ignition independently of the gas conditions in the gap, by applying thereacross an elevated DC voltage of 150 to 2,000 volts, preferably 200 to 800 volts.

The present system has been found to be especially advantageous for the ignition of DC arcs between a welding or cutting electrode and a workpiece spaced therefrom in protective gas atmospheres of an inert gas, especially helium. According to a more specific feature of this invention, therefore, the welding process is carried out with a T.I.G. (tungsten inert gas) or plasma-welding head in a sealed chamber to which helium is supplied as the protective gas. The system has been found to be extremely important for the welding of fuel element shells for nuclear reactors since continuity of welding and the quality of the weld are such that such elements can be sealed with assurance and minimum disturbance from the protective gas. In addition, this technique eliminates all danger to operating personnel who remain outside the closed chamber and manipulate the welding head and the workpiece from the exterior.

When the system of the present invention is carried out in the open, however, it is important to prevent contact of the welding head or the workpiece by operating personnel because of the high voltages applied during the inception of ionization. No such problem arises in closed chamber welding as previously mentioned. The termination of the superimposed high-voltage direct current is, according to the present invention, effected within an interval of at most one second after it has been applied and, as a rule, within an interval of tenths of a second. In some cases, it is possible to reduce this interval to the order of milliseconds.

The ignition circuit, according to the present invention, includes a welding current source having a sharply decreasing voltage characteristic and can include a transformer having a primary winding connected to the alternating current line source and a secondary winding connected across a rectifier bridge whose output terminals are applied across the electrode and the workpiece; the transformer can be of the field dissipative type to ensure the steep characteristic. The desired sharply decreasing voltage characteristic can be realized also by providing in series with one of the windings of the transformer an appropriately dimensioned choke or ohmic resistance.

According to another feature of this invention, the transformer has a primary winding and a secondary winding at least one of which is tapped and provided with an electronic switch to cut in or cut out one of the transformer sections, thereby decreasing the ratio of effective secondary turns to primary turns in response to the detection of a current flow in the output circuit of the rectifier. An electronic switch consisting of a pair of bucking solid-state controlled rectifiers or thyristors, may be used for this purpose while a relay of the electromagnetic type may be employed in conjunction with the electronic switch or independently thereof. The output circuit of the system thus can include a choke connected in series with one output terminal of the rectifier bridge and to the workpiece while the other output terminal of the rectifier bridge is connected to the electrode. In this series circuit, there is further included a current responsive detector for operating the electronic switch. The detector may be connected to the thyristor switch via a time constant network with an externally small time constant (e.g., from the order of milliseconds to the order of tenths of a second), so that the effective duration of the elevated potential will be of the magnitude indicated previously. Consequently, the switching circuit has a steep characteristic of the desired slope. It will be understood also that a completely independent source may be provided for the arc ignition voltage.

The above and other objects, features and advantages of the present invention will become more readily apparent from the following description, reference being made to the accompanying drawing in which:

FIG. 3 represents still another arrangement for igniting DC arcs; and

FIG. 4 shows a circuit having distinct sources for the igniting potential and the welding potential.

Figure 1:
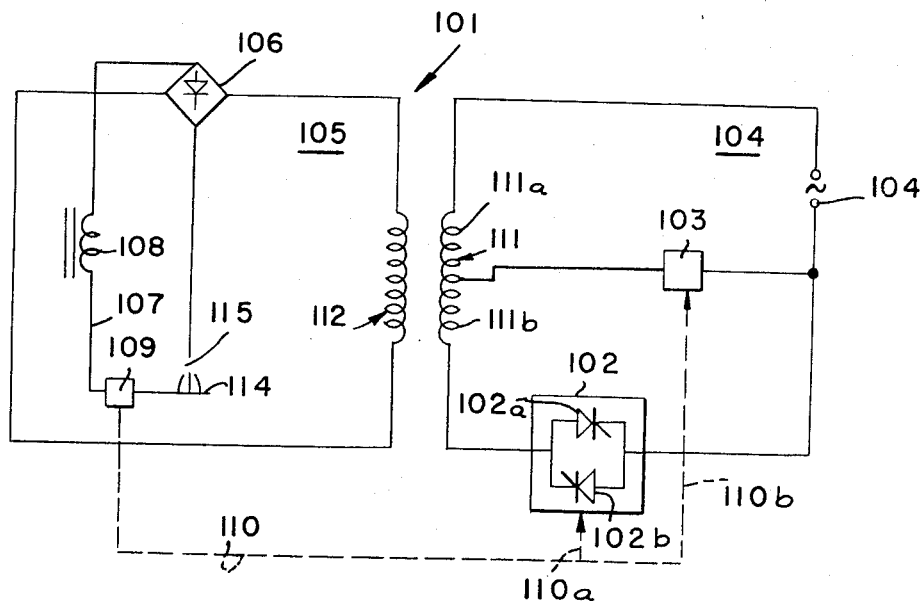
FIG. 1 is a circuit diagram illustrating the problems of the present invention and in which the electronic switch is provided in the primary circuit.

In FIG. 1, we have shown a circuit in which the welding transformer 101 has a tapped primary winding 111 whose sections are represented at 111a and 111b while the output cited in the system is shown at 105 and includes the secondary winding 112 of this transformer. The primary circuit 104 includes a source of alternating line current 104a connected across section 111a of primary winding 111 in series with a relay switch 103.

The secondary circuit 105 includes a rectifier bridge 106 whose input terminals are tied across the secondary winding 112 of transformer 101 and whose output terminals 106 are connected to an electrode 113 of a plasma or T.I.G. welding head spaced across a gap 115 from the workpiece 114.

The workpiece is connected in series with a current responsive detector 109 (e.g., a current transformer or a low-ohmic resistor as shown in FIG. 3) and a choke 108 to the other output terminal of the rectifier bridge 106. An electronic switch 102, in the form of a pair of antiparallel or bucking solid-state control rectifiers or thyristors 102a and 102b is connected in series with the other section 111b of the primary winding 111. When the thyristors 102a and 102b are conductive and relay 103 is open-circuited, the line current at 104a is applied across the full primary winding 111 to induce in the secondary winding 112 the normal welding potential without step-up or stepdown. When, however, the thyristors 102a and 102b are nonconductive and relay 103 is closed, the line voltage is applied only across section 111a of the primary winding 111 so that the voltage across the secondary winding 112 is stepped up sharply for purposes of ignition. The current detector 109 is connected as represented at 110 to the gates of the controlled rectifiers 102a and 102b (via line 110a) and the relay 103 (via line 110b).

At the inception of the welding operation, thyristors 102a and 102b are nonconductive while relay 103 is closed. Under these conditions, the voltage applied across the electrode 113 and the workpiece 114 is of the higher level (i.e., 200 to 800 volts) and ionization of the inert gas in the gap 115 (see FIG. 3) is promoted. In fact, it is found that ignition occurs spontaneously almost instantly. As the gases ionized in the gap 115 (the potential being above the breakdown potential of the gap) current flows in the form of an arc between the electrode 113 and the workpiece 114 to produce a corresponding increase in the current flow through the welding circuit 107, thereby energizing the detector 109 and switching, when the desired current level is reached, the relay 103 and both thyristors 102a and 102b. The effective number of turns of the primary winding is thereby increased with reduction of the potential across the workpiece and electrodes to the operating level, (up to 100 volts) in short order.

Figure 2:
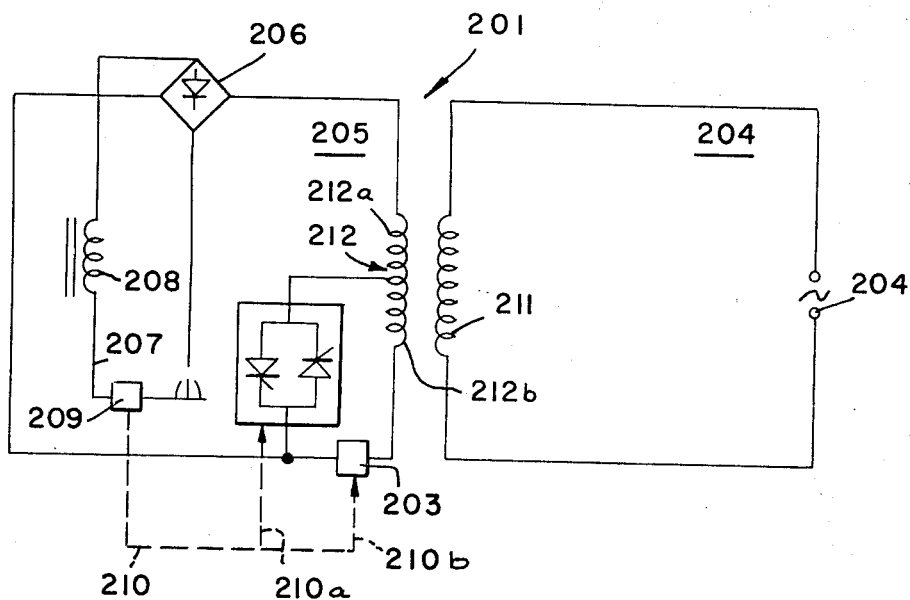
FIG. 2 is another circuit embodying the principles of the present invention and having the electronic switch connected in the secondary circuit.

In the system of FIG. 2, the full line voltage is applied at 204a to the primary circuit 204 and the untapped primary winding 211 while the secondary winding 212 of the transformer 201 is tapped to provide the sections 212a and 212b. The entire secondary winding is connected in series with the relay 203 across the input terminals of the rectifier bridge 206 while a thyristor switch 202 (consisting of a pair of antiparallel thyristors) is connected in shunt across the secondary winding section 212b. The output terminals of the rectifier bridge 206 are connected in series with the electrode, the workpiece, a choke 208, and a current detector 209 in the welding circuit 207 as previously described. The detector 209 operates the electronic switch 202 and the electromagnetic switch 203 as represented by the lines 210, 210a and 210b. At the inception of welding, the thyristor switch 202 is nonconductive while the electromagnetic switch 203 is closed circuited, thereby applying the full potential of the secondary winding 212, in stepped-up configuration, across the bridge 206 and thereby energizing the electrode and the workpiece with a DC voltage level above the breakdown potential of the gap. As soon as the current begins to flow in the circuit 207, the detector 209 renders the thyristors 202 conductive while open circuiting relay 203 to render only the section 212a of the secondary effective, thereby reducing the potential across the bridge 206 to the desired operating level.

FIG. 3 represents a system for the welding of stainless steel or zirconium alloy shells 314 of fuel elements for nuclear reactors. The shell is here enclosed in a sealed chamber 319 filled with helium as represented by the tank 317, and receiving the welding head 313 which is spaced from the nuclear fuel element shell 314 by the gap 315. In this embodiment, the transformer 301 has a tapped primary winding 311 whose sections 311a and 311b are provided with a relay 303a, 303b and a controlled rectifier switch 302, 302a, 302b, as described in connection with FIG. 1.

The secondary winding 312 of the transformer 301 is tapped and includes the relay 303' whose coil 303b' operates a switch 303a'. A pair of antiparallel controlled rectifiers 302a' and 302b' form an electronic switch 302' performing a function similar to that described in connection with FIG. 2.

In the welding circuit 307 connected across the output terminals of the rectifier bridge 306, we have placed a choke 308 and a current-detecting device 309 whose taps are adjustable to pickoff a voltage drop corresponding to the selected threshold current from the operation of the switching devices. The detecting resistance 309a of the detecting circuit 309 includes a signal amplifier 309b and a time-constant network 309c and is connected to the gates of the controlled rectifiers 302a, 302b and 302a', 302b'.

During the inception of the welding arc, the switch 303a of relay 303 is closed while thyristors 302a and 302b are nonconductive and switch 303a' of relay 303' is closed, whereas thyristors 302a' and 302b' are nonconductive. As a result, the primary voltage is applied only over section 311a of the transformer primary while the secondary voltage is tapped from the entire secondary winding 312, thereby stepping up the voltage applied across the gap 315 and initiating the arc as previously discussed. When current flow commences across the gap 315, a corresponding potential is tapped at resistor 309a and is amplified at 309b to reverse the switches 302, 302' and 303, 303'. After a period (determined by the time constant network 309c) of the order of milliseconds up to tenths of a second. The switches 303a and 303a' open while electronic switches 302 and 302' are rendered conductive, thereby switching the voltage across the electrode and workpiece to the normal operating level.

In FIG. 4, we show a modified system wherein independent sources are provided for the working voltage and the superimposed potential. In this system, the working voltage is supplied by a transformer 401 whose primary winding is energized by the line current source 404 and whose secondary winding operates a rectifier bridge 406 energizing the electrode 413 and the workpiece 414 via a choke 415 and a current detector 409. The superimposed ignition potential is obtained from a transformer 401' of the step-up type whose secondary winding 412' is connected across a rectifier bridge 406', the output terminals of which are in parallel with those of the bridge 406. In the primary energizing circuit of transformer 401', we have provided a thyristor switch 402 which is triggered by the detectors 409; the latter also operates a relay 403 whose switch contacts are in circuit with the primary winding of transformer 401. At the inception of the welding operation, relay 403 opens circuit transformer 401 and the higher DC voltage of transformer 401' is applied across the gap. Upon detection of current flow in the system, circuit element 409 closes relay 403 and renders the electronic switch 402 nonconductive.

The improvement described and illustrated is believed to admit of many modifications within the ability of persons skilled in the art, all such modifications being considered within the spirit and scope of the invention except as limited by the appended claims.

We claim:

1. An electrode, a workpiece spaced from the electrode to form an arc therebetween for direct current arc welding and for cutting of said workpiece, and a circuit for energizing said electrode and workpiece, the improvement wherein said circuit comprises:

a transformer having primary winding means connected to a source of line current, and secondary winding means inductively coupled with said primary winding means;

rectifier means connected with said secondary winding means and energizable thereby while having a direct current output connected to said workpiece and said electrode;

switch means including a pair of antiparallel connected thyristors in circuit with said transformer for temporarily increasing the effective secondary winding/primary winding turn ratio in a first condition of said switch means and reducing said ratio in a second condition of said switch means;

current detector means in circuit with said rectifier means, said electrode and said workpiece, and operatively connected with said switch means for switching same from said first condition to said second condition upon the generation of a discharge between said electrode and said workpiece when said switch means is in said first position; and an electromechanical switch in circuit with said source and at least part of said primary winding means and closed-circuited upon switching of said switch means from said first condition to said second condition.

2. The circuit defined in claim 1 wherein said primary winding means includes a first section and a second section, said source being connected across said first section, said thyristors being connected between said source and said second section wherein said thyristors apply said source across both said sections in a conductive state of said thyristors but open circuit said second section in a nonconductive state of said thyristors.

3. The circuit defined in claim 1 wherein said secondary winding means includes a pair of interconnected sections jointly connected across said rectifier means, said thyristors being connected in shunt across one of said sections for applying the other of said sections across the rectifier means in a conductive condition of said thyristors but applying both said sections across said rectifier means in a nonconductive condition of said thyristors.

4. The circuit defined in claim 1, further comprising a choke connected in circuit with said workpiece, said electrode and said rectifier means.

* * * * *